(12) United States Patent
Lee et al.

(10) Patent No.: US 7,573,453 B2
(45) Date of Patent: Aug. 11, 2009

(54) LIQUID CRYSTAL DISPLAY AND DRIVING DEVICE OF THE SAME

(75) Inventors: Jun-Pyo Lee, Gyeonggi-do (KR); Jang-Hyun Yeo, Seoul (KR); Jae-Hyoung Park, Yongin-si (KR); Woo-Chul Kim, Yongin-si (KR); Jung-Hwan Cho, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 674 days.

(21) Appl. No.: 11/259,897

(22) Filed: Oct. 27, 2005

(65) Prior Publication Data

US 2006/0097971 A1 May 11, 2006

(30) Foreign Application Priority Data

Nov. 5, 2004 (KR) .................. 10-2004-0089646

(51) Int. Cl.
*G09G 3/36* (2006.01)
(52) U.S. Cl. .................. 345/98; 345/87; 349/39; 349/106
(58) Field of Classification Search .......... 345/87, 345/98; 349/39, 106
See application file for complete search history.

(56) References Cited

U.S. PATENT DOCUMENTS

| 2002/0149598 | A1 | 10/2002 | Greier et al. | |
|---|---|---|---|---|
| 2003/0001810 | A1* | 1/2003 | Yamaguchi et al. | 345/87 |
| 2003/0016318 | A1* | 1/2003 | Liang et al. | 349/106 |
| 2003/0128306 | A1* | 7/2003 | Kai | 349/39 |
| 2004/0164938 | A1 | 8/2004 | Choi et al. | |
| 2004/0179029 | A1 | 9/2004 | Ogawa et al. | |

FOREIGN PATENT DOCUMENTS

| CN | 1512828 A | 7/2004 |
|---|---|---|
| JP | 8201777 A | 8/1996 |
| JP | 2003050566 | 2/2003 |
| JP | 2003099017 | 4/2003 |
| JP | 2003295160 | 10/2003 |
| JP | 2003308048 | 10/2003 |
| JP | 2004163897 | 6/2004 |
| KR | 102003008044 | 1/2003 |
| KR | 1020030003870 | 1/2003 |
| KR | 1020030093835 | 12/2003 |
| KR | 100419090 | 2/2004 |
| KR | 1020040034364 | 4/2004 |

* cited by examiner

*Primary Examiner*—Amare Mengistu
*Assistant Examiner*—Premal Patel
(74) *Attorney, Agent, or Firm*—Cantor Colburn LLP

(57) ABSTRACT

A liquid crystal display includes first and second opposing spaced insulating substrates, pixel electrodes formed on the first substrate, a common electrode formed on at least one of the first and second substrates, and a liquid crystal layer interposed there between the first substrate and the second substrate. In this structure, each pixel electrode is divided into a main-pixel electrode and a sub-pixel electrode, to which different signal voltages are individually applied at the same gray scale. Further, a signal voltage to be applied to the sub-pixel electrodes is determined by a gamma value satisfying the following equation:

Gamma $K$=(current gray scale/maximum gray scale)$^\gamma$ $F$(Gray Scale)=$\alpha$×(maximum gray scale/current gray scale), wherein $\alpha$ is a constant.

21 Claims, 10 Drawing Sheets

LIQUID CRYSTAL DISPLAY AND DRIVING DEVICE OF THE SAME

This application claims priority to Korean Patent Application No. 10-2004-0089646, filed on Nov. 5, 2004 and all the benefits accruing therefrom under 35 U.S.C. §119, and the contents of which in its entirety are herein incorporated by reference.

BACKGROUND OF THE INVENTION (a) Field of the Invention

The present invention relates generally to a liquid crystal display ("LCD") and a driving device of the same. More particularly, the present invention relates to an LCD having improved visibility and a driving device of the same.

(b) Description of the Related Art

Generally, an LCD includes a pair of panels individually having electrodes on their inner surfaces, and a dielectric anisotropy liquid crystal layer interposed between the panels. In the LCD, the variation of the voltage difference between the field generating electrodes, i.e., the variation in the strength of an electric field generated by the electrodes, changes the transmittance of the light passing through the LCD, and thus desired images are obtained by controlling the voltage difference between the electrodes.

However, the viewing angle of the LCD may not as wide as desired. Accordingly, various methods to overcome such a drawback have been developed in the field of LCDs. The most conspicuous one among recently proposed methods to ensure a wide viewing angle is the method of aligning liquid crystal molecules perpendicularly to upper and lower panels, and forming an aperture pattern or projection pattern in the field generating electrodes.

In particular, the aperture pattern formation method utilizes a fringe field that occurs near the apertures formed in the pixel electrodes and the common electrode. That is, the fringe field controls tilt directions of the liquid crystal molecules to ensure the wide viewing angle.

The projection forming method utilizes projections formed on the pixel electrodes and the common electrode of the upper panel. These projections distort an electric field generated between the two electrodes, so that tilt directions of the liquid crystal molecules are controlled.

In another method, apertures are formed in the pixel electrodes of the lower panel and projections are formed on the common electrode of the upper panel. The fringe field caused by the apertures and projections controls tilt directions of the liquid crystal molecules, thereby forming a multi-domain structure to ensure the wide viewing angle.

In multi-domain LCDs, a 10:1 contrast ratio-based viewing angle, or a gray scale conversion-based viewing angle defined as a critical angle of luminance conversion between the gray scales, is more than 80 degrees in all directions. In spite of such a good characteristic, the LCDs exhibit poor visibility at left and right sides of the screen due to a disagreement between a gamma curve at the front and a gamma curve at the side. For example, in a patterned vertically alignment ("PVA") mode LCD, where an aperture pattern is formed in the common electrode in order to form a multi-domain structure, the luminance of the screen becomes higher and the color becomes closer to white as a viewing point moves to a side of the screen from a front center. In more excessive cases, intervals between the grayscales become too narrow, so that images may be dully expressed.

Recently, concern about the visibility of an LCD has increased due to the increasing use of LCDs in multimedia fields for enjoying moving pictures and still images.

BRIEF SUMMARY OF THE INVENTION

The present invention realizes an LCD with prominent visibility such as by providing a pixel electrode divided into two sub-pixel electrodes and applying different voltages individually thereto.

In an exemplary embodiment of the present invention, there is provided an LCD including a first insulating substrate, a second insulating substrate opposed to and spaced from the first insulating substrate, a plurality of pixel electrodes formed on the first substrate, a common electrode formed on at least one of the first substrate and the second substrate, and a liquid crystal layer interposed between the first substrate and the second substrate.

In this structure, each pixel electrode is divided into a main-pixel electrode and a sub-pixel electrode to form a plurality of main-pixel electrodes and sub-pixel electrodes, to which different signal voltages are individually applied at a same gray scale.

Further, a signal voltage to be applied to the sub-pixel electrodes is determined by a gamma value satisfying the following equation:

$$\text{Gamma } K = (\text{current gray scale/maximum gray scale})^f$$

$$f(\text{Gray Scale}) = \alpha \times (\text{maximum gray scale/current gray scale}),$$

wherein $\alpha$ is a constant.

Here, it is preferable that a gamma value of the main-pixel electrodes is obtained by deducting a gamma value of the sub-pixel electrodes from two times a target gamma value, and the main-pixel electrodes and the sub-pixel electrodes are alternately arranged, in all lines and all rows.

The LCD may be further comprised of a thin film transistor ("TFT") formed on the first substrate to switch on or off the signal voltage applied to the pixel electrodes.

The main-pixel electrodes and the sub-pixel electrodes may have different areas from each other, and the pixel electrode and the common electrode each may include a domain forming means.

The LCD may be further comprised of a plurality of gate lines formed on the first substrate and a plurality of data lines insulated from and intersected with the gate lines.

Preferably, the domain forming means includes two portions formed at 45 degrees with respect to the gate lines, perpendicular to each other. The portions may include linearly-shaped apertures within the pixel electrodes and the common electrode.

A signal voltage applied to a main-pixel electrode may be higher than a signal voltage applied to a sub-pixel electrode at the same gray scale, and a set of a main-pixel electrode and a sub-pixel electrode function together as a pixel unit and represent one color.

In another exemplary embodiment of the present invention, there is provided a device for driving a display device that outputs gate control signals and data control signals after receiving input control signals from an external device, and outputs image signals for sub-pixels and image signals for main-pixels after receiving input image signals from an external device.

Here, the image signals for the main-pixels are determined by a gamma value satisfying the following equation:

Gamma $K$=(current gray scale/maximum gray scale)$^f$ $F$(Gray Scale)=$\alpha \times$(maximum gray scale/current gray scale), wherein $\alpha$ is a constant.

This device includes a lookup table LUT for storing the image signals for the main-pixels and the image signals for the sub-pixels relative to all image signals used in the display device, and detects the image signals for the sub-pixels and the image signals for the main-pixels relative to input image signals from the lookup table LUT, and then outputs the detected image signals.

In this device, it is preferable that a gamma value determining the image signals for the main-pixels is obtained by deducting a gamma value determining the image signals for the sub-pixels from two times a target gamma value.

In still another exemplary embodiment of the present invention, there is provided an LCD including: a first insulating substrate; a gate line formed on the first substrate with a gate electrode; a gate insulating layer formed on the gate lines; an amorphous silicon layer formed on the gate insulating layer; an ohmic contact formed on the amorphous silicon layer; a data line formed on the gate insulating layer, of which at least a partial portion includes a source electrode formed on the ohmic contact; a drain electrode opposite the source electrode, of which at least a partial portion is placed on the ohmic contact; a passivation layer formed on the data line and the drain electrode; a pixel electrode formed on the passivation layer and connected to the drain electrode; a second insulating substrate opposite the first insulating substrate; a common electrode formed on the second substrate; a first domain forming means formed on at least one of the first substrate and the second substrate; and a second domain forming means formed on at least one of the first substrate and the second substrate to divide a pixel region into a plurality of sub-domains in cooperation with the first domain forming means.

In this structure, the pixel electrode is divided into a main-pixel electrode and a sub-pixel electrode, to which different signal voltages are individually applied at the same gray scale.

Further, the signal voltage for the main-pixel electrode is determined by a gamma value satisfying the following equation:

Gamma $K$=(current gray scale/maximum gray scale)$^f$ $f$(Gray Scale)=$\alpha \times$(maximum gray scale/current gray scale), wherein $\alpha$ is a constant.

In still another exemplary embodiment of the present invention, there is provided an LCD including a plurality of pixel electrodes divided into main-pixel electrodes and sub-pixel electrodes, to which different signal voltages are individually applied at a same gray scale, and a signal voltage applied to the sub-pixel electrodes determined by a gamma value Gamma K=(current gray scale/maximum gray scale)$^f$ wherein exponent f is not a constant.

The exponent f varies with respect to current gray scale and a minimum value of f occurs at the maximum gray scale. The exponent f is determined by an equation f (gray scale)=$\alpha \times$ (maximum gray scale/current gray scale), wherein $\alpha$ is a constant.

A gamma value of the main-pixel electrodes is obtained by deducting a gamma value of the sub-pixel electrodes from twice a target gamma value.

The sub-pixel electrodes have a different size than the main-pixel electrodes, and a signal voltage applied to a main-pixel electrode is higher than a signal voltage applied to a sub-pixel electrode at the same gray scale.

BRIEF DESCRIPTION OF THE DRAWINGS

The above objects and other advantages of the present invention will become more apparent by describing the preferred embodiments thereof in more detail with reference to the accompanying drawings, wherein.

DETAILED DESCRIPTION OF THE INVENTION

Figure 1:
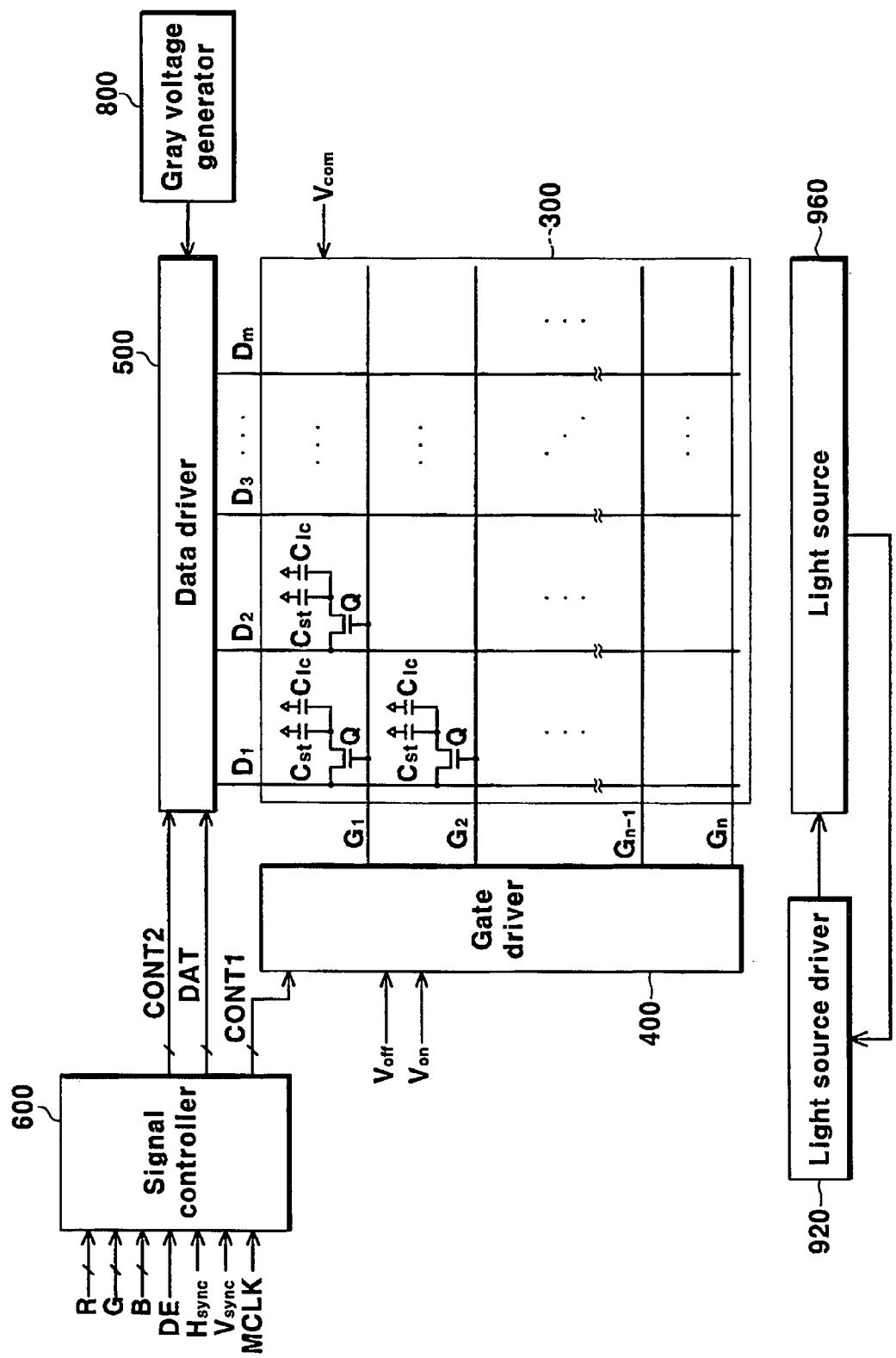
FIG. 1 is a block view of an exemplary embodiment of an LCD according to the present invention.

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Hereinafter, LCDs according to preferred embodiments of the present invention will be described in detail with reference to the accompanying drawings.

Figure 2:
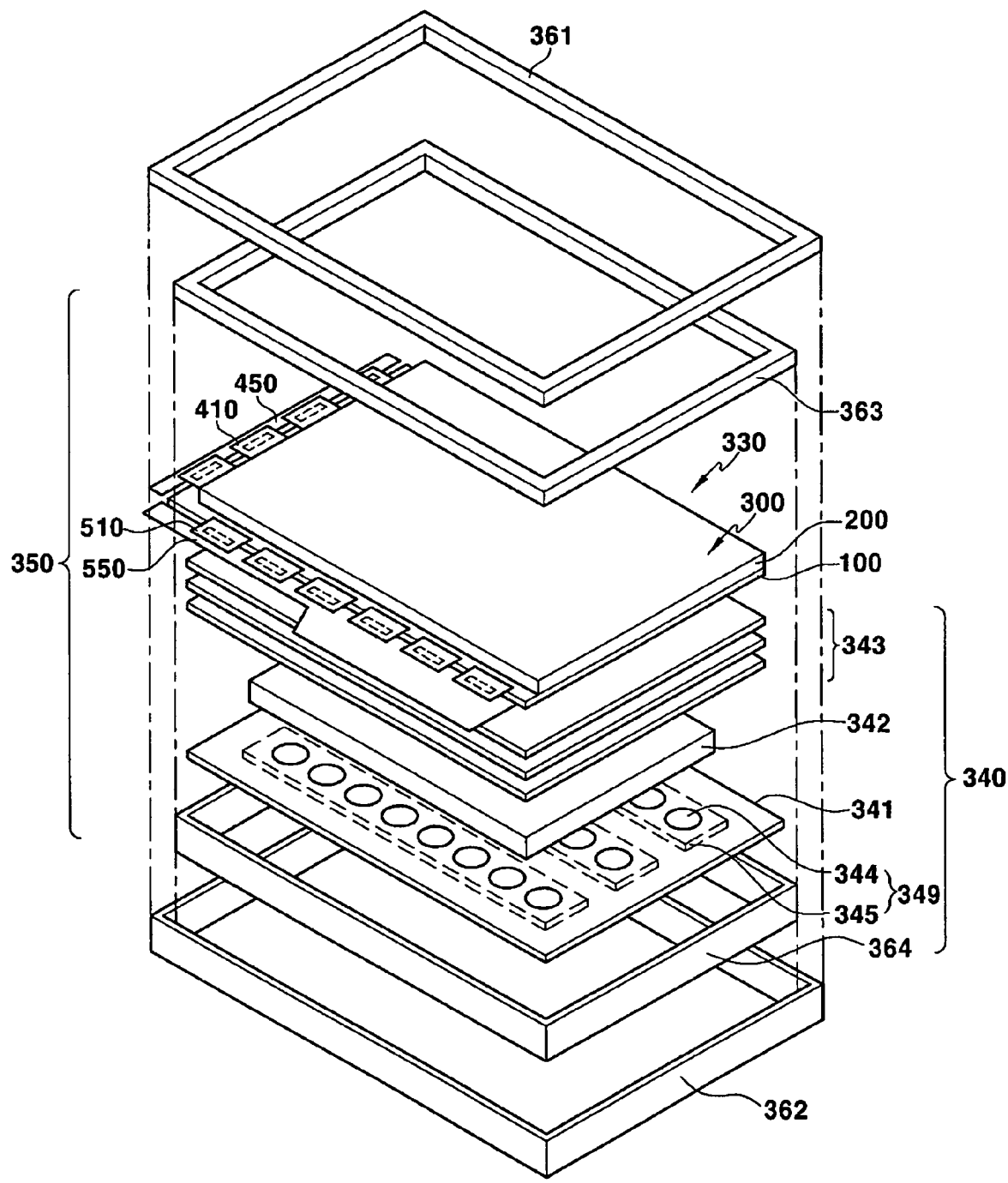
FIG. 2 is an exploded perspective view schematically illustrating an exemplary embodiment of an LCD according to the present invention.
Figure 3:
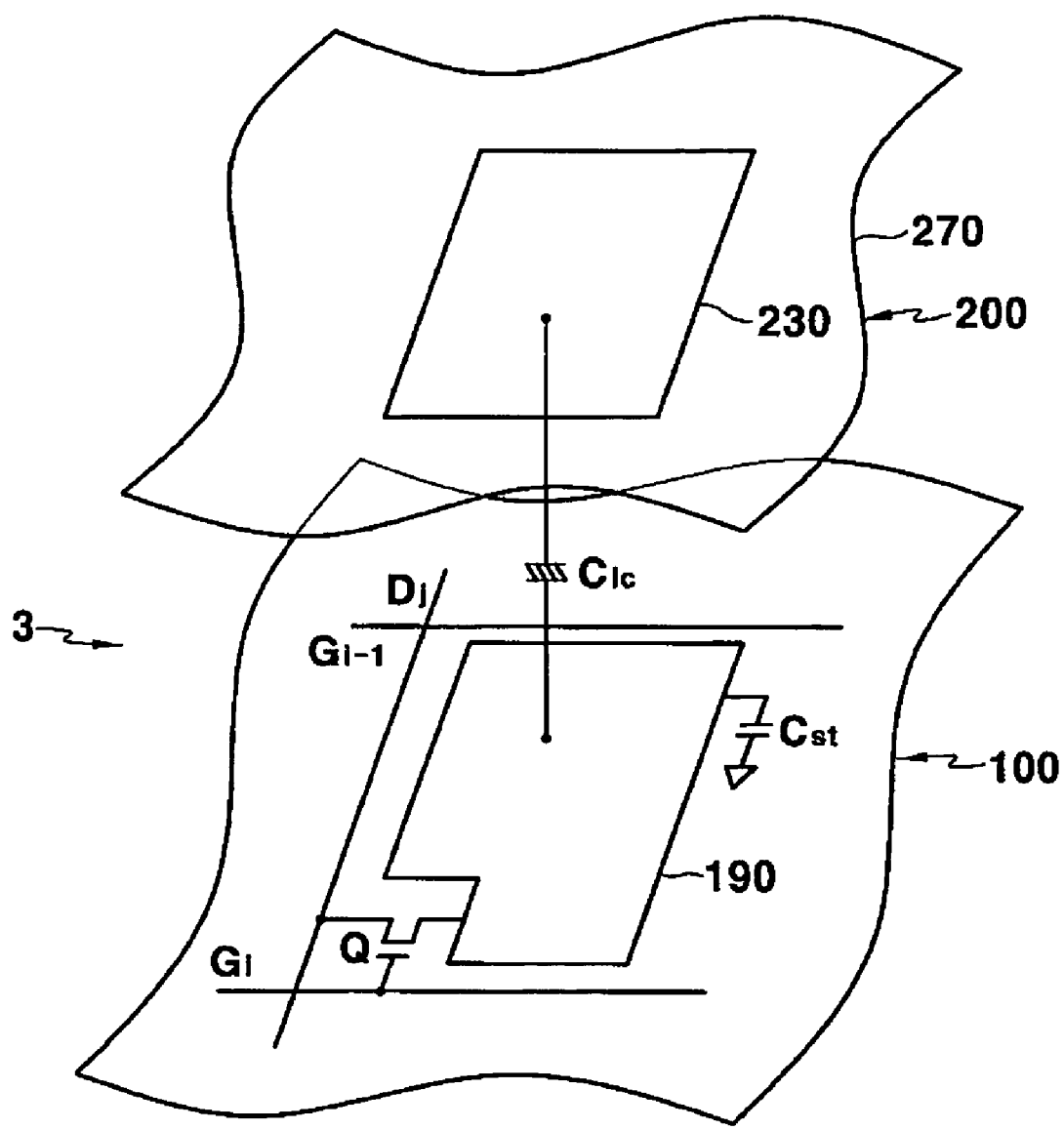
FIG. 3 is an equivalent circuit view of an exemplary embodiment of a pixel unit of an LCD according to the present invention.

FIG. 1 is a block diagram of an exemplary embodiment of an LCD according to the present invention, FIG. 2 is an exploded perspective view schematically illustrating an exemplary embodiment of an LCD according to the present invention, and FIG. 3 is an equivalent circuit view of an embodiment of a pixel unit of an LCD according to the present invention.

Referring to FIG. 1, an LCD includes an LC panel assembly 300, a gate driver 400 and a data driver 500 that are connected to the LC panel assembly 300, a gray voltage generator 800 connected to the data driver 500, a light source section 960 for supplying light to the LC panel assembly 300, a light source driver 920 for controlling the light source section 960, and a signal controller 600 for controlling the above elements.

Referring to FIG. 2, the LCD includes an LC module 350 including a display unit 330 and a backlight unit 340, a front housing 361 and a rear housing 362, alternatively known as a front chassis and rear chassis, respectively, for receiving and supporting the LC module 350, and mold frames 363 and 364.

The display unit 330 includes the LC panel assembly 300, a gate tape carrier package ("TCP") 410 and a data TCP 510 that are attached to the LC panel assembly 300, and a gate printed circuit board ("PCB") 450 and a data PCB 550 that are individually attached to the corresponding TCPs 410 and 510, respectively. The gate and data TCPs 410 and 510 may alternatively be chip-on-film ("COF") type packages.

In the structure shown in FIGS. 2 and 3, the LC panel assembly 300 includes a lower panel 100 as a thin film transistor ("TFT") panel and an upper panel 200 as a color filter panel, where the panels 100 and 200 face each other, and an LC layer 3 interposed therebetween. In the circuit shown in FIGS. 1 and 3, the LC panel assembly 300 further includes a plurality of display signal lines $G_1$-$G_n$ and $D_1$-$D_m$ and a plurality of pixels connected thereto and arranged substantially in a matrix in circuital view.

The display signal lines $G_1$-$G_n$ and $D_1$-$D_m$ are provided on the lower panel 100 and include a plurality of gate lines $G_1$-$G_n$ for transmitting gate signals (also referred to as "scanning signals"), and a plurality of data lines $D_1$-$D_m$ for transmitting data signals. The gate lines $G_1$-$G_n$ extend substantially in a row direction and are substantially parallel to each other, while the data lines $D_1$-$D_m$ extend substantially in a column direction and are substantially parallel to each other.

Each pixel includes a switching element Q connected to the display signal lines $G_1$-$G_n$ and $D_1$-$D_m$, and an LC capacitor $C_{LC}$ and a storage capacitor $C_{ST}$ connected to the switching element Q. In an alternative embodiment, the storage capacitor $C_{ST}$ may be omitted.

The switching element Q, such as a TFT, is provided on the lower panel 100 and has three terminals including a control terminal connected to one of the gate lines $G_1$-$G_n$, an input terminal connected to one of the data lines $D_1$-$D_m$, and an output terminal connected to both the LC capacitor $C_{LC}$ and the storage capacitor $C_{ST}$.

The LC capacitor $C_{LC}$ includes a pixel electrode 190, provided on the lower panel 100, and a common electrode 270, provided on the upper panel 200, as two terminals. The LC layer 3, interposed between the two electrodes 190 and 270, functions as a dielectric of the LC capacitor $C_{LC}$. The pixel electrode 190 is connected to the switching element Q, and the common electrode 270 is supplied with a common voltage $V_{com}$, and covers an entire surface, or substantially the entire surface, of the upper panel 200. In an alternative embodiment, the common electrode 270 may be provided on the lower panel 100 and at least one of the pixel electrode 190 and the common electrode 270 may be shaped as a bar or a stripe.

The storage capacitor $C_{ST}$ is an auxiliary capacitor for the LC capacitor $C_{LC}$. When the pixel electrode 190 and a separate signal line (not shown), which is provided on the lower panel 100, are overlapped with each other, with an insulator interposed therebetween, the overlapped portion becomes the storage capacitor $C_{ST}$. The separate signal line is supplied with a predetermined voltage such as the common voltage $V_{com}$. Alternatively, the storage capacitor $C_{ST}$ may be formed by overlapping the pixel electrode 190 and an adjacent gate line known as a previous gate line that is placed directly before the pixel electrode 190, with an insulator interposed therebetween.

For color display, each pixel uniquely exhibits one of the three colors (i.e., spatial division), such as one of three primary colors or one of the red, blue, and green colors, or sequentially exhibits three colors in turn depending on time (i.e., temporal division), such as one of three primary colors or one of the red, blue, and green colors, so that the spatial or temporal sum of the colors is recognized as a desired color. While an example of a set of the colors includes red, green, and blue colors, it should be understood that alternate color sets may be employed. FIG. 3 shows an example of the spatial division where each pixel includes a color filter 230, for exhibiting one of the colors, in an area of the upper panel 200 corresponding to the pixel electrode 190. In an alternative embodiment, the color filter 230 may be provided on or under the pixel electrode 190 of the lower panel 100.

Referring again to FIG. 2, the backlight unit 340, forming part of the light source section 960, is mounted under the LC panel assembly 300. The backlight unit 340 includes a light source unit 349 including a plurality of light emitting diodes (LEDs) 344 arrayed on a PCB 345 shown in phantom, a light guiding plate 342, and a plurality of optical sheets 343 provided between the LC panel assembly 300 and the LEDs 344 for dispersing or otherwise adjusting the light emitted from the LEDs 344 to the LC panel assembly 300. The backlight unit 340 further comprises a reflective plate 341, which is placed over the PCB 345 and includes a plurality of holes where light emitting chips of the LEDs 344 are protruded there through, to reflect the light emitted from the LEDs 344 toward the LC panel assembly 300. The holes may have a circular shape such that the corresponding LED 344 is projected through the hole. Alternative shapes of light emitting holes, such as a rectangular shape or a slit shape that are adapted to project a predetermined number of the LEDs 344 would also be within the scope of these embodiments. Radiant heat members made of a heat conduction material may be attached to the PCBs 345 to radiate heat. The backlight unit 340 further comprises a mold frame 364, which is provided between the reflective plate 341 and the light guiding plate 342 for maintaining regular intervals between the light source unit 349 and the light guiding plate 342 and for supporting the light guiding plate 342 and the optical sheets 343 relative to the light source unit 349. A power supply applies a supply voltage to the light source unit 349.

The LEDs 344 as the light source may utilize only white LEDs emitting white light, or a mixing array of red, green, and blue LEDs. A mixing array of a white LED and a red LED may be also used. In this case, the red LED functions as an auxiliary of the white LED. The LEDs are arranged on the PCB 345 in a predetermined form, thereby forming the light source unit 349. Each PCB 345 may be arranged horizontally along a longitudinal axis, and may mount in turn the red, green, and blue LEDs 344. The number of the LEDs 344 may be changed, and alternate arrangement of the LEDs 344 are within the scope of these embodiments.

FIG. 2 shows three light source units 349, but the number of the light source units 349 can be changed depending on the required brightness and the size of the LCD.

Although LEDs 344 are illustrated within the light source unit 349, the backlight unit 340 may alternatively utilize fluorescent lamps, such as cold cathode fluorescent lamps ("CCFLs"), external electrode fluorescents ("EEFLs"), etc., as the light source.

Figure 8:
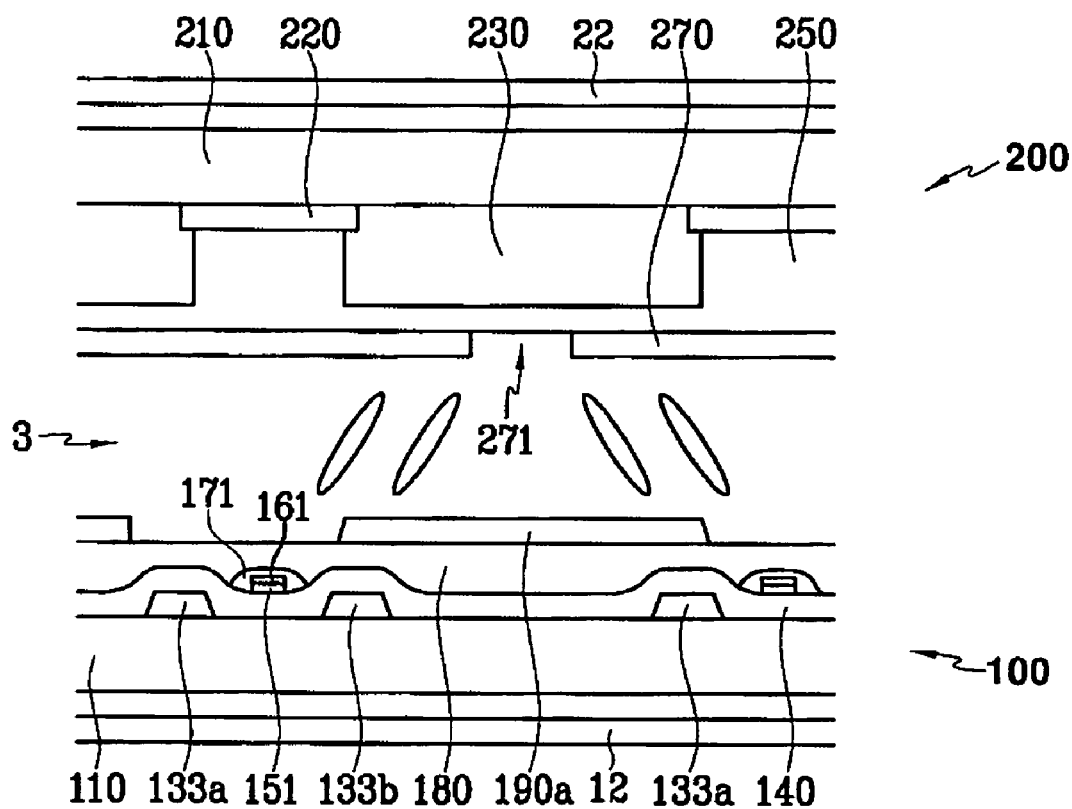
FIG. 8 is a cross-sectional view cut along line VIII-VIII' of FIG. 7.

One or more polarizers may be provided on the outer surfaces of the two panels 100 and 200 for polarizing the light emitted from the light source units 349. Exemplary polarizers 12 and 22 are illustrated in FIG. 8.

Referring to FIG. 1 and FIG. 2, the gray voltage generator 800 generates a plurality of gray scale voltages relating to the brightness of the LCD. The gray voltage generator 800 may be included in the data PCB 550, generates two sets of a plurality of gray voltages related to the transmittance of the pixels, and provides the gray voltages to the data driving part 500. The data driving part 500 applies the gray voltages, which are selected for each data line $D_1$-$D_m$, by control of the signal controller 600, to the data line respectively as a data signal. The gray voltages in one set have positive polarity with respect to the common voltage $V_{com}$, while those of the other set have negative polarity with respect to the common voltage $V_{com}$.

The gate drivers 400 are individually mounted on each gate TCP 410, having the shape of an integrated circuit ("IC") chip, and are individually connected to the gate lines $G_1$-$G_n$ of the LC panel assembly 300 for transmitting the gate signals consisting of combinations of the gate-on voltage $V_{on}$ and the gate-off voltage $V_{off}$ input from an external device to the gate signal lines $G_1$-$G_n$.

The data drivers 500 are individually mounted on each data TCP 510, having the shape of IC chips, and are individually connected to the data lines $D_1$-$D_m$ of the LC panel assembly 300 for transmitting the data voltages, which are selected from the gray voltages supplied from the gray voltage generator 800, to the data signal lines $D_1$-$D_m$.

In another embodiment of the present invention, the gate driver 400 or the data driver 500 may be directly mounted on the lower panel 100 without TCPs, having the shape of an IC chip such as in a "chip on glass" ("COG") type of mounting, and in still another embodiment of the present invention, the gate driver 400 or the data driver 500 is integrated into the lower panel 100 along with the other elements, such as the switching elements Q, the gate lines $G_1$-$G_n$, and the data lines $D_1$-$D_m$. In the above cases, the gate PCB 450 or the gate TCP 410 can be omitted.

Just as the data PCB 550 may mount the gray voltage generator 800, the signal controller 600 may be included in the data PCB 550 or the gate PCB 450 for controlling the operation of the gate driver 400 or the data driver 500. The signal controller 600 may further send signals to the light source section 960.

Hereinafter, the operation of the above-mentioned LCD will be described in detail.

The signal controller 600 receives red, green, and blue input image signals R, G, and B and input control signals for controlling the display thereof such as a vertical synchronizing signal $V_{sync}$, a horizontal synchronizing signal $H_{sync}$, a main clock signal MCLK, a data enable signal DE, etc., from an external graphic controller (not shown). In response to the input image signals R, G, and B and the input control signals, the signal controller 600 processes the image signals R, G, and B suitably for the operation of the LC panel assembly 300 and generates gate control signals CONT1 and data control signals CONT2, and then provides the gate control signals CONT1 and the data control signals CONT2 to the gate driver 400 and the data driver 500, respectively. The signal controller 600 may further provide backlight control signals to the light source section 960.

Also, the signal controller 600 has a lookup table LUT. The signal controller 600 detects image signals for sub-pixels and image signals for main-pixels relative to the input image signals R, G, and B from the lookup table LUT, and then transmits the detected image signals to the data driver 500 with image signals DAT.

The sub-pixel image signals stored in the lookup table LUT exhibit lower luminance than the input image signals R, G, and B, while the main-pixel image signals exhibit higher luminance than the input image signals R, G, and B, as will be further described below.

The gate control signals CONT1 include a vertical synchronizing start signal STV, that is a scanning start signal, for informing the beginning of a frame and having instructions to start scanning, at least one gate clock signal CPV for controlling the output time of the gate-on voltage $V_{on}$, and an output enable signal OE for defining the duration of the gate-on voltage $V_{on}$.

The data control signals CONT2 include a horizontal synchronizing start signal STH for informing the data driver 500 of the beginning of data transmission for a group of pixels, a load signal LOAD having instructions to apply the data voltages to the data lines $D_1$-$D_m$, a reverse signal RVS, otherwise known as an inversion signal, for reversing the polarity of the data voltages with respect to the common voltage $V_{com}$, and a data clock signal HCLK.

In response to the data control signals CONT2 from the signal controller 600, the data driver 500 successively receives the image data DAT, the processed image signals, for a row of the pixels from the signal controller 600, shifts them, converts the image data DAT into analog data voltages selected from the gray voltages supplied from the gray voltage generator 800, and then applies the data voltages to data lines $D_1$-$D_m$.

The gate driver 400 applies the gate-on voltage Von to the gate lines $G_1$-$G_n$ in response to the gate control signals CONT1 from the signal controller 600, thereby turning on the switching elements Q connected thereto. The data voltages applied to the data lines $D_1$-$D_n$ are applied to the corresponding pixels through the activated switching elements Q.

The difference between the data voltage applied to the pixel and the common voltage $V_{com}$ is represented as a charged voltage across the LC capacitor $C_{LC}$, namely, a pixel voltage. The LC molecules in the LC capacitor $C_{LC}$ have orientations depending on the magnitude of the pixel voltage.

The light source driver 920 controls current applied to the light source section 960 for switching the LEDs 344 of the light source section 960, and also controls the brightness of the light from the LEDs 344.

When the light emitted from the LEDs 344 passes through the LC layer 3, the polarization of the light is varied according to the orientations of the LC molecules. The polarizer, such as polarizers 12 and 22, converts the difference of the light polarization into a difference of the light transmittance.

By repeating this procedure by a unit of the horizontal period (which is denoted by "1H" and equal to one period of the horizontal synchronizing signal $H_{sync}$, the data enable signal DE, and the gate clock signal CPV), all gate lines $G_1$-$G_n$ are sequentially supplied with the gate-on voltage $V_{on}$ during a frame, thereby applying the data voltages to all pixels. When the next frame starts after finishing one frame, the reverse control signal RVS, part of the data control signals CONT2, applied to the data driver 500 is controlled such that the polarity of the data voltages is reversed with respect to that of the previous frame (which is referred to as "frame inversion"). The reverse control signal RVS may also be controlled such that the polarity of the data voltages flowing along a data line in one frame is reversed (for example, line inversion and dot inversion), or the polarity of the data voltages in one packet is reversed (for example, column inversion and dot inversion).

Figure 4:
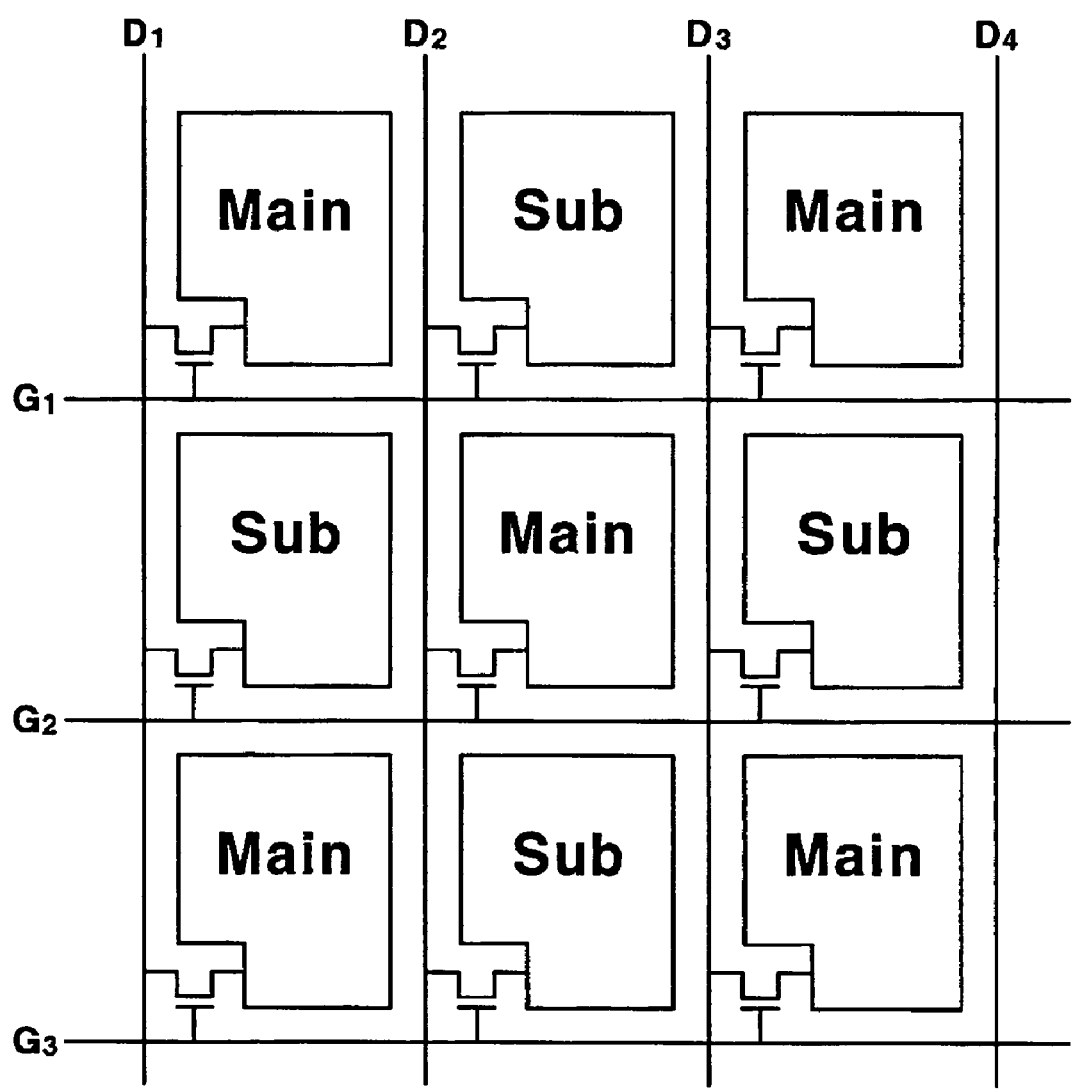
FIG. 4 shows an exemplary embodiment of an arrangement of pixels of a TFT panel according to the present invention.

FIG. 4 shows an exemplary embodiment of an arrangement of pixels of a TFT panel according to the present invention.

Referring to FIG. 4, the lower panel 100 as the TFT panel of this embodiment is provided with a plurality of pixels arranged substantially in a matrix. These pixels are defined by intersecting a plurality of gate lines $G_1, G_2, G_3 \ldots$ with a plurality of data lines $D_1, D_2, D_3 \ldots$ Each pixel is provided with a TFT as a switching element Q, and a pixel electrode, such as pixel electrodes 190, connected to the TFT.

In this structure, the pixels are classified into main-pixels and sub-pixels according to the difference between the gray voltages applied to the corresponding pixel electrodes 190. When two kinds of pixels exhibit the same gray scale, the voltage applied to the pixel electrode 190 of the main-pixel is higher than the voltage applied to the pixel electrode 190 of the sub-pixel.

In this case, a set of a main-pixel and a sub-pixel function together as a pixel unit representing one color, thereby improving visibility at the sides of a screen. That is, in order to compensate for any distortion of a gamma curve (representing the relation between gray scales and luminance) caused when a viewing point is placed at the side of the LCD, a pixel unit is divided into two portions, in which one portion represents lower luminance than the target luminance, and the other portion represents higher luminance than the target luminance, so that the average luminance of the two is practically recognized. In other words, adjacent pixels have different transmittance from each other according to the portion, thereby visibility becomes enhanced.

In FIG. 4, the main-pixels and sub-pixels are alternately arranged in all rows and in all columns, but the arrangement of the pixels may be modified in various manners.

The main-pixel and the sub-pixel are structurally similar since they are divided depending on only the gray voltage applied thereto, but their dimension may be controlled at any case. That is, the dimensions of the sub-pixels may differ from the dimensions of the main-pixels.

Hereinafter, the basic structure of the pixel will be described in more detail.

Figure 5:
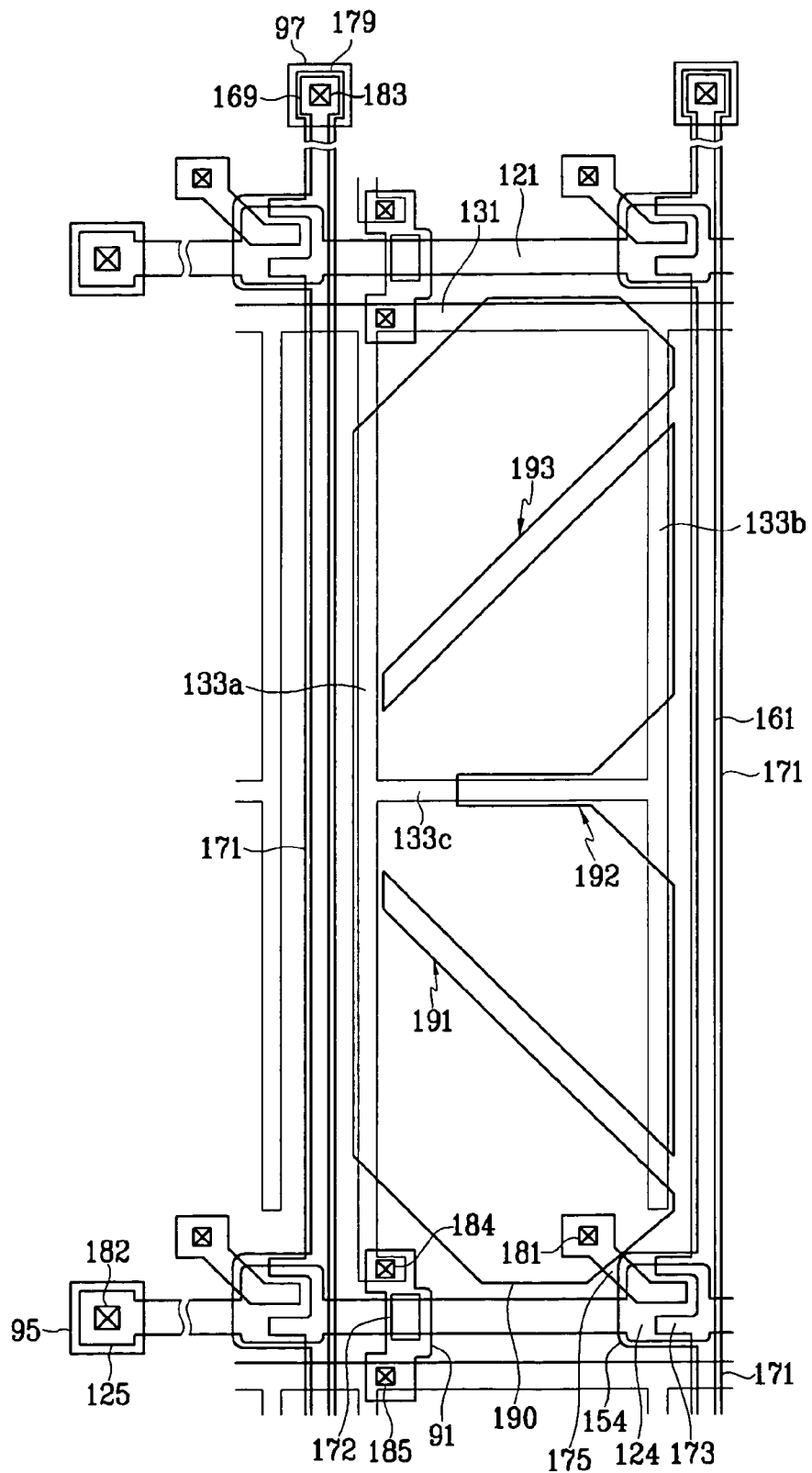
FIG. 5 is a layout view of an exemplary embodiment of a TFT panel according to the present invention.
Figure 6:
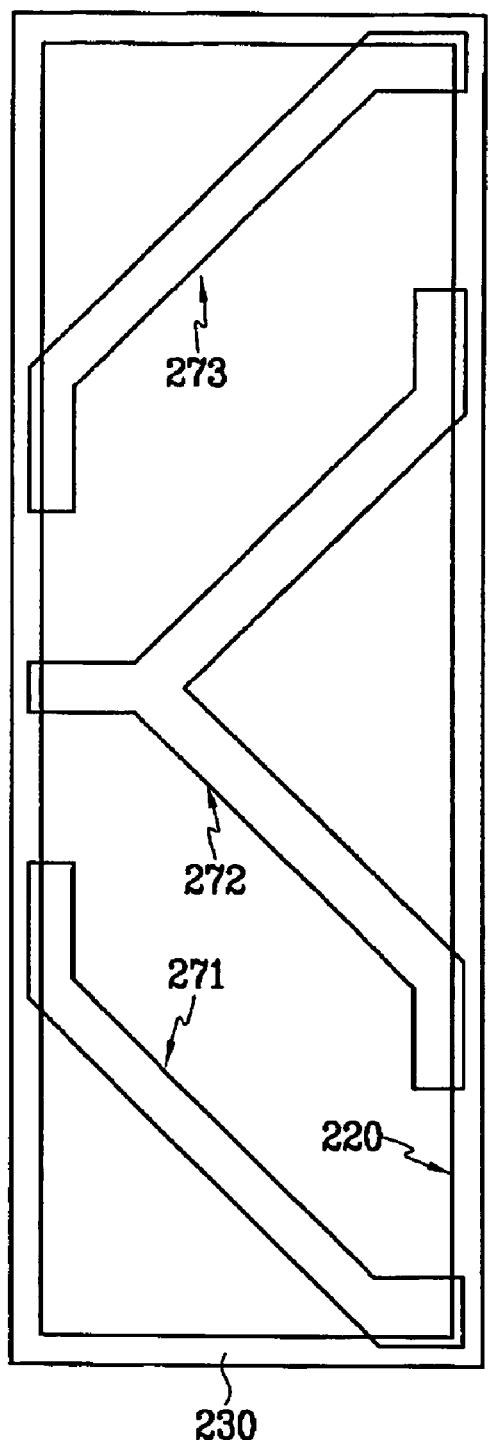
FIG. 6 is a layout view of an exemplary embodiment of a color filter panel according to the present invention.
Figure 7:
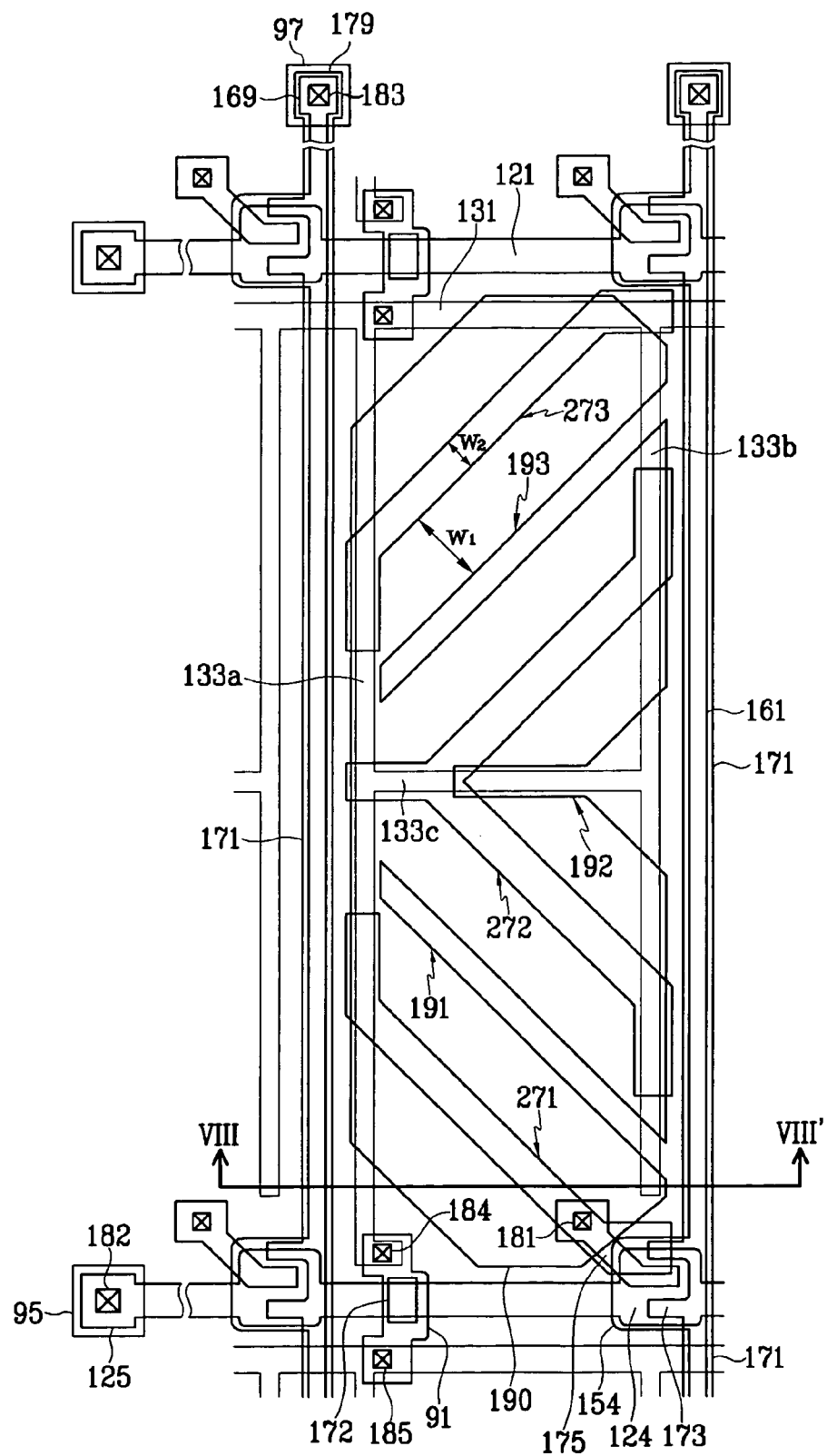
FIG. 7 is a layout view of an exemplary embodiment of an LCD according to the present invention.

FIG. 5 is a layout view of an exemplary embodiment of a TFT panel according to the present invention, FIG. 6 is a layout view of an exemplary embodiment of a color filter panel according to the present invention, FIG. 7 is a layout view of an exemplary embodiment of an LCD according to the present invention, and FIG. 8 is a cross-sectional view cut along line VIII-VIII' of FIG. 7.

The lower panel 100 as a TFT panel of an LCD panel assembly is configured as will be further described below.

A pixel electrode 190 made of a transparent conductive material, such as indium tin oxide ("ITO") or indium zinc oxide ("IZO"), is formed on an insulating substrate 110 made of a transparent insulating material such as, but not limited to, glass. The pixel electrode 190 is connected to a TFT. In this structure, the TFT is connected to a gate line 121, for transmitting a scanning signal, and a data line 171, for transmitting an image signal, and turns on or off the image signal applied to the pixel electrode 190 in response to the scanning signal applied through the gate line 121. The pixel electrode 190 includes an aperture pattern including three apertures 191, 192, and 193. The aperture pattern divides the liquid crystal layer 3 into a plurality of domains with a common electrode aperture pattern, as will be further described below. The pixel electrode aperture pattern may include an incision intersecting the pixel electrode 190 in a generally angular direction with respect to a direction of the gate lines 121 and the data lines 171, as shown by apertures 191 and 193. The pixel electrode aperture pattern may further include an incision intersecting the pixel electrode 190 in a generally perpendicular direction to the data line 171, as shown by aperture 192.

Aperture 192 may further include a V-shaped portion opening up in the direction of an adjacent data line 171. While a particular aperture pattern has been illustrated, alternate pixel electrode aperture patterns would also be within the scope of these embodiments.

A lower polarizer 12 is provided on a bottom surface of the insulating substrate 110, and an upper polarizer 22 is provided on an upper surface of the insulating substrate 210. In reflective type LCDs, the pixel electrode 190 may be made of different materials instead of the transparent material, and the lower polarizer 12 would be unnecessary.

Next, the upper panel 200 as a color filter panel is configured as will be further described below.

As shown in FIG. 6, a black matrix 220 for preventing light leakage, R, G, and B color filters 230, and a common electrode 270 made of a transparent conductive material such as ITO or IZO, are formed on an insulating substrate 210 made of a transparent insulating material such as, but not limited to, glass. The common electrode 270 includes an aperture pattern including three apertures 271, 272, and 273. The aperture pattern may include an incision intersecting the common electrode 270 in a generally angular direction with respect to a direction of the gate lines 121 and the data lines 171. For example, the common electrode aperture pattern may include an incision shown as aperture 272 having a V-shape larger than the V-shape of the pixel electrode aperture 192. The common electrode aperture pattern may further include an incision shown as aperture 271 parallel to one side of the V-shape pattern, and another incision shown as aperture 273 parallel to another side of the V-shape pattern. While the pixel electrode and the common electrode are spaced apart in a thickness direction by the liquid crystal layer 3, the pixel electrode aperture pattern and the common electrode aperture pattern are also spaced apart in a horizontal direction as shown by example in FIG. 7. While a particular pattern has been illustrated, alternate common electrode aperture patterns would also be within the scope of these embodiments. The black matrix 220 may be formed on an overlap portion of the apertures 271, 272, and 273 and the color filters 230, as well as around the pixel region for preventing the light from leaking through the apertures 271, 272, and 273.

Hereinafter, the TFT panel 100 will be further described.

A plurality of gate lines 121 and a plurality of storage electrode lines 131, extending substantially in a horizontal direction, are formed on the insulating substrate 110 of the TFT panel 100.

Each gate line 121 includes a plurality of gate electrodes 124 protruding downwardly from the gate line 121 and each gate line 121 includes an end portion 125 having a relatively large dimension to be connected to an external device.

Each storage electrode line 131 includes plural sets of storage electrodes 133a, 133b, and 133c. Among a set of the storage electrodes, two storage electrodes 133a and 133b extend in a vertical direction generally parallel to the data lines 171 and are connected to the remaining storage electrode 133c that extends in a horizontal direction generally parallel to the gate lines 121 and the storage electrode lines 131. The storage electrode 133c may be located generally half-way between adjacent gate lines 121, however alternate locations for the storage electrode 133c are also within the scope of these embodiments. Each storage electrode line 131 may include more than two horizontal lines.

The gate lines 121 and the storage electrode lines 131 may be made of an aluminum (Al) containing metal, such as Al and/or an Al alloy, a silver (Ag) containing metal, such as Ag and/or a Ag alloy, chrome (Cr), titanium (Ti), tantalum (Ta), molybdenum (Mo), or the like. In this embodiment, the gate lines 121 and the storage electrode lines 131 have a single-layered structure. However, the gate lines 121 and/or the storage electrode lines 131 may have a double-layered structure including two metal layers having different physical properties. In this case, one of the two layers may be made of a low resistivity metal, for example, an Al containing metal or a Ag containing metal, and the other layer may be made of a metallic material having prominent physical and chemical properties such as Cr, Mo, Ti, Ta, etc.

Preferably, all lateral sides of the gate lines 121 and the storage electrode lines 131 slope by 30° to 80° relative to the surface of the insulating substrate 110.

A gate insulating layer 140 made of, by example only, nitride silicon (SiNx), etc., is formed on the gate lines 121 and the insulating substrate 110, and may also be formed on the storage electrode lines 131 and the storage electrodes 133a, 133b, 133c.

A plurality of data lines 171, a plurality of drain electrodes 175, and a plurality of under-bridge metal pieces 172 are formed on the gate insulating layer 140. Thus, while the data lines 171 and the gate lines 121 perpendicularly cross over each other, they are insulated from each other by the gate insulating layer 140. Each data line 171 extends substantially in a vertical direction perpendicularly to the gate lines 121 and includes a plurality of branch-shaped source electrodes 173, each extending corresponding to respective gate electrodes 124. Each under-bridge metal piece 172 is placed on respective gate lines 121.

Similar to the gate lines 121, the data lines 171, drain electrodes 175, and under-bridge metal pieces 172 are made of Cr, Al, etc., and may have a single-layered structure or multi-layered structure.

A plurality of linear semiconductors 151 made of hydrogenated amorphous silicon or the like, are formed under the data lines 171, as shown in FIG. 8, and under the drain electrodes 175. Each linear semiconductor 151 extends substantially in a vertical direction and includes a plurality of branches, each extending corresponding to respective gate electrodes 124, source electrodes 173, and drain electrodes 175. Each branch forms a TFT channel 154, as shown in FIG. 5.

A plurality of ohmic contacts 161, made of silicide or N+hydrogenated amorphous silicon that is highly doped with N-type impurities, are formed between the semiconductors 151 and the data lines 171 and between the drain electrodes 175 and the semiconductors 151, in order to reduce contact resistance therebetween.

A passivation layer 180, made of an inorganic insulating material such as $SiN_2$, etc., or an organic insulating material such as resin, etc., is formed on the data lines 171, the drain electrodes 175, and the under-bridge metal pieces 172, as well as on the gate insulating layer 140.

The passivation layer 180 has a plurality of contact holes 181 and 183, through which at least partial portions of the drain electrodes 175 and the end portions 179 of the data lines 171 are exposed, respectively. A plurality of contact holes 182, 184, and 185 are formed to penetrate the passivation layer 180 and the gate insulating layer 140, where end portions 125 of the gate lines 121 and partial portions of the storage electrodes 133a and storage electrode lines 131 are individually exposed.

A plurality of pixel electrodes 190, a plurality of contact assistants 95 and 97, and a plurality of storage bridges 91 are formed on the passivation layer 180. The pixel electrodes 190, the contact assistants 95 and 97, and the storage bridges 91 are made of transparent conductive materials such as ITO, IZO, etc., or opaque conductive materials having good reflectivity, such as Al.

The pixel electrodes 190 are connected to the drain electrodes 175 through the contact holes 181. As previously described, three apertures 191, 192, and 193 are included in each pixel electrode 190. The apertures 191 and 193 among the three are formed at 45 degrees to the gate lines 121, while being perpendicular to each other. The remaining aperture 192 is formed by digging, i.e. incising, from a right vertical side of the pixel electrode 190 toward a left vertical side thereof, in a horizontal direction. An opening of this aperture 192, formed at the right vertical side of the pixel electrode 190, is shaped as a funnel.

Each pixel electrode 190 is substantially symmetrized with respect to a line, parallel to the gate line 121, that bisects a pixel that is defined by the gate lines 121 and the data lines 171 intersecting each other.

Each storage bridge 91 is formed on the passivation layer 180, spanning the gate line 121 to interconnect two storage electrode lines 131 of the adjacent pixel regions. The storage bridges 91 are connected to the storage electrodes 133a and the storage electrode lines 131 through the contact holes 184 and 185 penetrating the passivation layer 180 and the gate insulating layer 140. Also, the storage bridges 91 are overlapped with the under-bridge metal pieces 172. Accordingly, the storage bridges 91 can electrically interconnect the entire storage electrode lines 131 of the lower insulating substrate 110. Thus, when any defect is detected in the gate lines 121 or data lines 171, the storage electrode lines 131 may be used for repairing the defective gate line 121 or data line 171. Further, when a laser beam is irradiated to repair such a defective line, the under-bridge metal pieces 172 supplement the electrical connection between the gate lines 121 and the storage bridges 91.

The contact assistants 95 and 97 are individually connected to the end portions 125 of the gate lines 121 and the end portions 179 of the data lines 171 through the contact holes 182 and 183.

As previously described with respect to FIG. 6, a black matrix 220 is provided on the upper insulating substrate 210 to prevent light leakage, and RGB color filters 230 are formed on the black matrix 220. A common electrode 270, made of a transparent conductive material such as ITO, IZO, etc., is formed on the color filters 230, with plural sets of apertures 271, 272, and 273.

As further shown in FIGS. 6 and 7, a set of apertures 271, 272, and 273 includes oblique portions, parallel to the apertures 191 and 193 of the pixel electrodes 190 formed at 45 degrees with respect to the gate lines 121, and end portions that are overlapped with sides of the pixel electrodes 190. The end portions include two vertical end portions and two horizontal end portions. The apertures 191 and 193 of the pixel electrodes 190, formed at 45 degrees with respect to the gate lines 121, are provided between the apertures 271 and 272 of the common electrode 270, and between the apertures 272 and 273 of the common electrode 270. Other aperture patterns for the pixel electrodes 190 and the common electrode 270 would be within the scope of these embodiments.

When the above-mentioned TFT panel 100 and color filter panel 200 are assembled, with vertically aligned liquid crystal molecules interposed there between within a liquid crystal layer 3, an LCD panel assembly is completed.

In such an LCD panel assembly, a set of apertures 271, 272, and 273 of the common electrode 270 and a set of apertures 191, 192, and 193 of the pixel electrode 190 divide the pixel electrode 190 into a plurality of sub-areas, particularly eight sub-areas in this embodiment. As shown in FIG. 7, each sub-area is substantially long, and thus a length and a width thereof are different.

The partial liquid crystal layer interposed between a sub-area of the pixel electrode 190 and a corresponding sub-area of the common electrode 270 may be referred to as a "sub-region". Such a sub-region may further be classified into four domains according to the average orientation of the long axes of the liquid crystal molecules when an electric field is generated.

In this way, the pixel region is divided into a plurality of domains, and the orientation of the liquid crystal molecules within each domain is controlled, enabling the LCD to have wide-viewing angles.

Meanwhile, the side visibility can be improved by applying different gray voltages to the main-pixels and the sub-pixels. Two important factors influencing the side visibility are the area ratio between the main-pixel and the sub-pixel, and a gamma curve of the sub-pixel.

The area ratio between the main-pixel and the sub-pixel is a structurally controllable factor. In other words, the area ratio can basically be controlled based on a desirable luminance of the LCD and actual side visibility.

Therefore, the gamma curve of the sub-pixel is the most important factor for improving the side visibility.

In general, typical vertical, nematic mode LCDs have poor side visibility. This is because the luminance at the side is higher than that at the front. The luminance increases more rapidly at a medium gray scale where viewer's eyes react most sensibly, degrading the visibility. It should be understood that a gray scale includes the levels of gray ranging from true white to true black. The level of gray, or white or black, is derived from the luminance portion of the signal. Thus, a medium gray scale would be located approximately midway between true white and true black.

Accordingly, to improve the side visibility efficiently, the gamma curve of the sub-pixel should be set up so that the luminance of the sub-pixel is maintained in considerably low levels, up to the medium gray scale, for example, about 120 in 256 grayscales. That is, in this example, the luminance of a sub-pixel would be nearly zero at the low end of the grayscale, until the gray scale is approximately 120.

The gamma value of the main-pixel is calculated as follows. First, a target gamma value at the front is set up to be equal to the average gamma value between the main-pixel and the sub-pixel. Thus, a gamma curve representing the front target would be located between gamma curves of the main-pixel and the sub-pixel. Accordingly, the gamma value of the main-pixel is obtained by deducting the gamma value of the sub-pixel from two times the target gamma value. In an alternative embodiment, the gamma value of the sub-pixel may be obtained by deducting the gamma value of the main-pixel from two times the target gamma value.

Generally, the gamma value K is set up to satisfy the following equation 1:

Gamma $K=\text{(current gray scale/maximum gray scale)}^K$ (Equation 1)

In this embodiment, the gamma curve of the sub-pixel is obtained by controlling the value of K in Equation 1.

Figure 9:
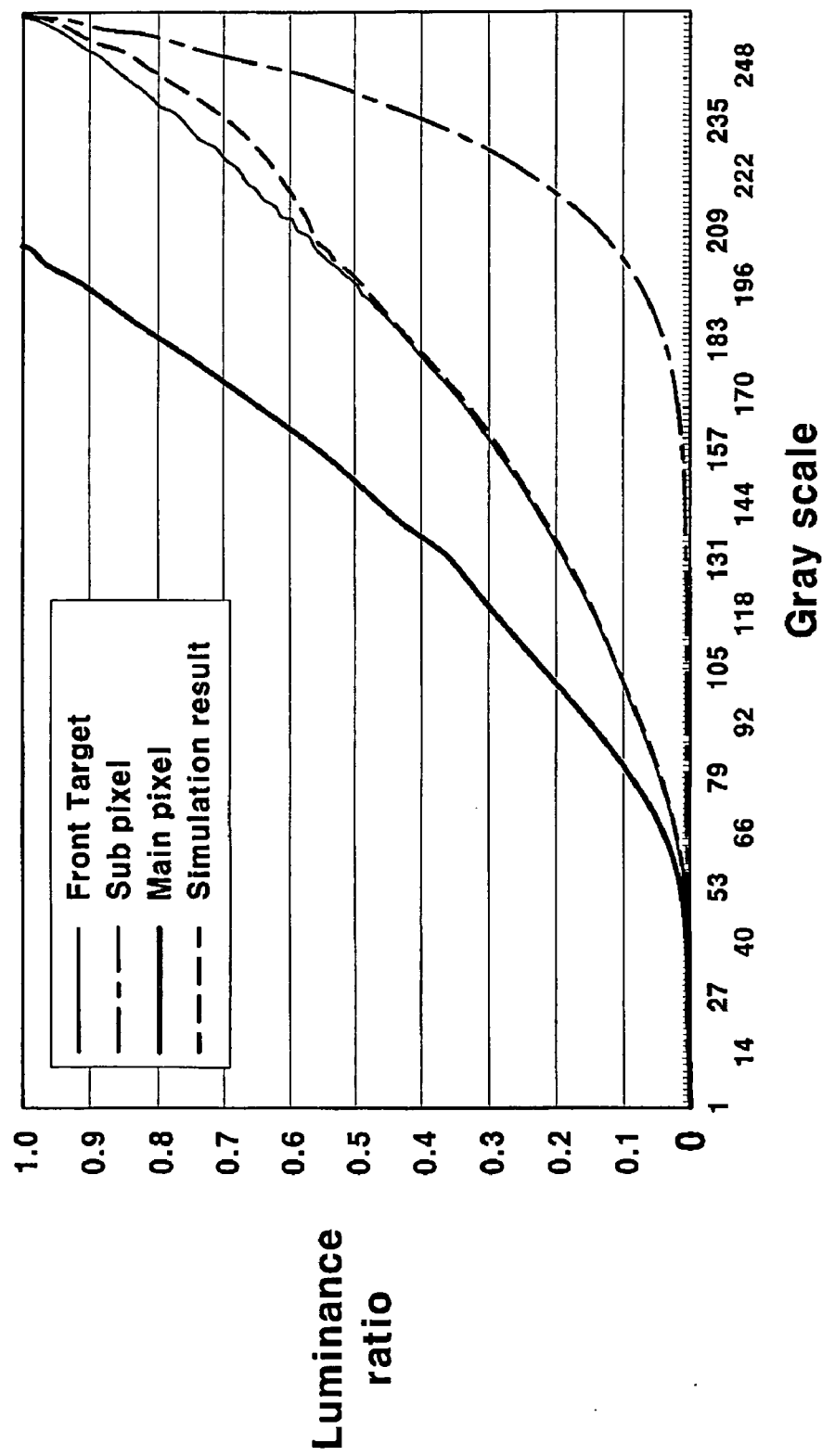
FIG. 9 is a graph for showing exemplary gamma curves of a main-pixel and a sub-pixel, and an average gamma curve of the two in an exemplary embodiment of an LCD according to the present invention; and, FIG. 10 is a graph for showing exemplary gamma curves of a main-pixel and a sub-pixel, and an average gamma curve of the two in another exemplary embodiment of an LCD according to the present invention.

For example, to improve the visibility, when the target gamma curve at the front is a curve where K=2.4, the gamma curve of the sub-pixel is set as K=9 so that the luminance for the gray scales below 120 is maintained in considerably low values nearly close to 0. In this case, however, a problem arises when the luminance of the main-pixel exceeds a maximum possible luminance of the LCD in the range of higher gray scales of above 200. Accordingly, as shown in FIG. 9, the gamma curve of the main-pixel stops at, and maintains, the maximum gamma level of 1 in the range of gray scales of above 200. In addition, a simulation result curve includes discontinuous points near the gray scale of about 200, and becomes lower than the front target gamma curve beyond the above-mentioned discontinuous range of gray scales above 200. These discontinuous points existing in the gamma curve may cause unnatural gray expression. It should be understood that, where the target gamma curve at the front includes a different value for K, then the gamma curve of the main-pixel may reach the maximum gamma level of 1 at a different gray scale. Also, it should be further understood that, while the example includes a gray scale extending to 256, alternate maximum gray scales may be employed.

If the gamma curve of the sub-pixel is set as a curve of K≦5.5, the above-mentioned problem can be solved, but the visibility degrades.

For theses reasons, in another embodiment of the present invention, the gamma curve is determined by the following equation 2.

Gamma $K=\text{(current gray scale/maximum gray scale)}^f$ $f(\text{Gray Scale})=\alpha \times \text{(maximum gray scale/current gray scale)}$, (Equation 2)

wherein α is a constant.

According to the equation 2, the exponent f has a minimum value α at the maximum gray scale, when the current gray scale equals the maximum gray scale such that α×1=α. Also, the exponent f increases as the gray scale level becomes smaller. Thus, the exponent f is not constant. Accordingly, the luminance for the gray scales below 120 is maintained in low levels nearly close to 0, but the luminance for the gray scales exceeding 120 forms a more slowly increasing curve than the gamma curve resulting from the equation 1.

Figure 10:
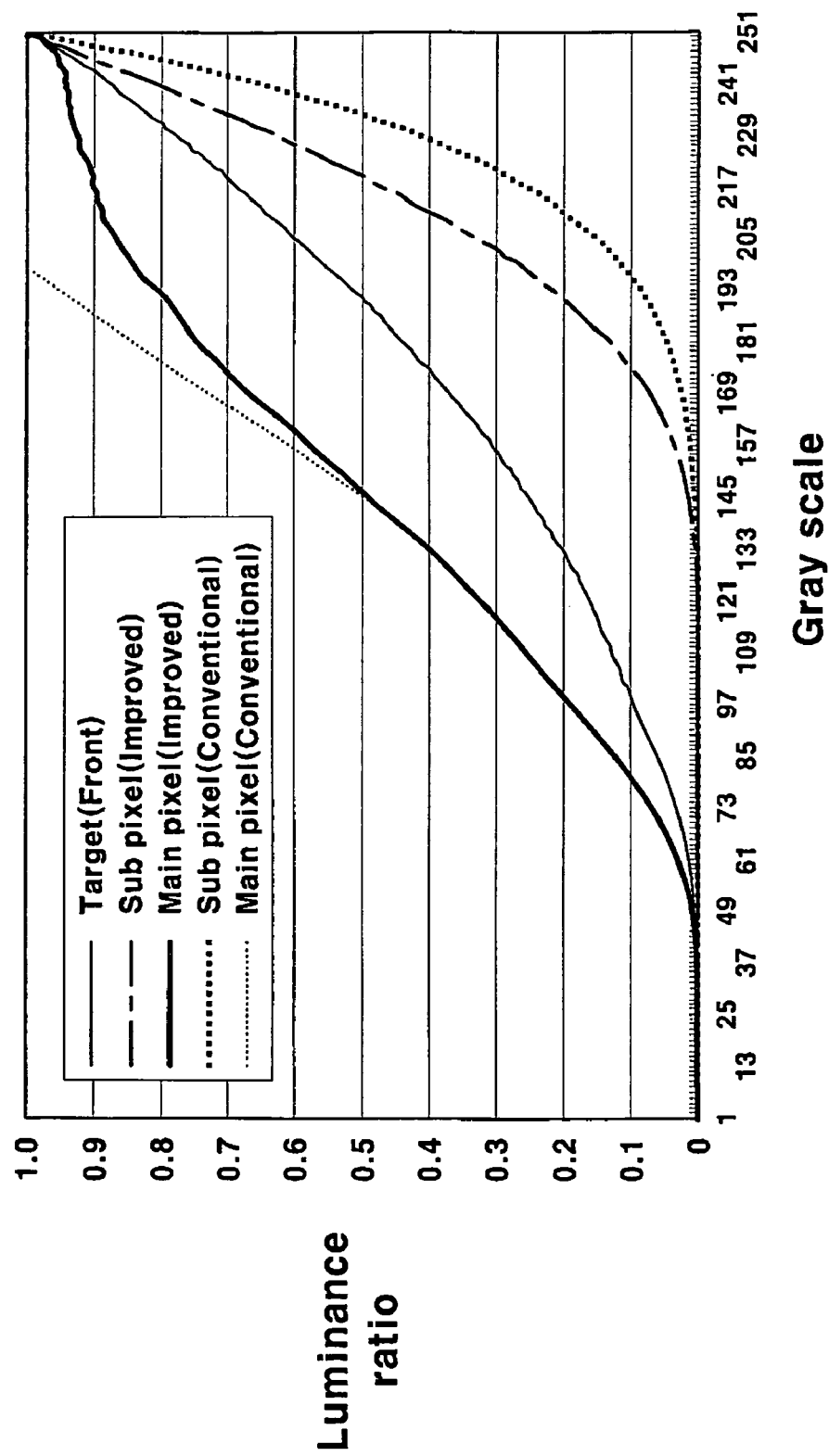

FIG. 10 shows gamma curves when α=4.3 in equation 2. For comparison, the gamma curves of the main-pixel and the sub-pixel of FIG. 9 are individually represented as dotted lines in this figure. While α=4.3 in this embodiment, it should be understood that alternate constants may be selected for equation 2.

As illustrated in FIG. 10, in the gamma curve of the sub-pixel (indicated by the alternating short and long dashed line), the luminance is maintained in low levels nearly close to 0 for the gray scales below 120, but rises for the gray scales exceeding 120. At this gamma curve for the sub-pixel, the rising slant is duller than that of FIG. 9. For example, the exponent values f within the equation 2 for the gray scales of 120 and 200 when α=4.3, are calculated as follow.

$f(120)=4.3\times(256/120)=9.17$ $f(200)=4.3\times(256/200)=5.5$

The obtained values correspond to K=9.17 and K=5.5 in equation 1. Thus, the exponent value varies with respect to the current gray scale. The minimum value of the exponent is equal to a constant used in the equation 2 for deriving the exponent value, and the constant is employed as the exponent value when the current gray scale is equal to the maximum gray scale. The exponent increases as the current gray scale decreases. Accordingly, the gamma curve of the main-pixel for all the gray scales may exist within the maximum gamma level. As mentioned in the above, the gamma curve of the sub-pixel, based on equation 2, does not create any visually perceptible discontinuities and improves the side visibility. As a result, the viewing angle of the LCD becomes wider.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification. By example only, the aperture patterns formed in the common electrodes and the pixel electrodes may be varied. Other modifications will also be readily apparent to those of skill in the art. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A liquid crystal display comprising:
    a first insulating substrate;
    a second insulating substrate opposed to and spaced from the first insulating substrate;
    a plurality of pixel electrodes formed on the first substrate;
    a common electrode formed on at least one of the first substrate and the second substrate; and
    a liquid crystal layer interposed between the first substrate and the second substrate,
    wherein each of the pixel electrodes is divided into a main-pixel electrode and a sub-pixel electrode to form a plurality of main-pixel electrodes and sub-pixel electrodes, to which different signal voltages are individually applied at a same gray scale, and
    wherein one of the signal voltages to be applied to the sub-pixel electrodes is determined by a gamma value satisfying the following equation $$\text{Gamma } K = (\text{current gray scale/maximum gray scale})^f$$

where $f(\text{Gray Scale}) = \alpha \times (\text{maximum gray scale/current gray scale})$, and $\alpha$ is a constant.

2. The liquid crystal display of claim 1, wherein a gamma value of the main-pixel electrodes is obtained by deducting a gamma value of the sub-pixel electrodes from two times a target gamma value.

3. The liquid crystal display of claim 1, wherein the main-pixel electrodes and the sub-pixel electrodes are alternately arranged, in all lines and all rows.

4. The liquid crystal display of claim 1 further comprising a thin film transistor formed on the first substrate to switch on or off the signal voltage applied to the pixel electrodes.

5. The liquid crystal display of claim 1, wherein the main-pixel electrodes and the sub-pixel electrodes have different areas from each other.

6. The liquid crystal display of claim 1, wherein the pixel electrodes and the common electrode each include a domain forming means.

7. The liquid crystal display of claim 6, further comprising:
    a plurality of gate lines formed on the first substrate; and
    a plurality of data lines insulated from and intersected with the gate lines,
    and wherein the domain forming means includes two portions formed at 45 degrees with respect to the gate lines, perpendicular to each other.

8. The liquid crystal display of claim 7, further comprising linearly-shaped apertures within the pixel electrodes and the common electrode as the portions.

9. The liquid crystal display of claim 1, wherein a signal voltage applied to a main-pixel electrode is higher than a signal voltage applied to a sub-pixel electrode at the same gray scale.

10. The liquid crystal display of claim 1, wherein a set of a main-pixel electrode and a sub-pixel electrode function together as a pixel unit and represent one color.

11. A device for driving a display device, the device outputting gate control signals and data control signals after receiving input control signals from an external device, the device outputting image signals for sub-pixels and image signals for main-pixels after receiving input image signals from an external device,
    wherein the image signals for the main-pixels are determined by a gamma value satisfying the following equation:

$$\text{Gamma } K = (\text{current gray scale/maximum gray scale})^f$$

where $f(\text{Gray Scale}) = \alpha \times (\text{maximum gray scale/current gray scale})$, and $\alpha$ is a constant.

12. The device of claim 11, further including a lookup table for storing the image signals for the main-pixels and the image signals for the sub-pixels relative to all image signals used in the display device, the device detecting the image signals for the sub-pixels and the image signals for the main-pixels relative to input image signals from the lookup table, and outputting the detected image signals.

13. The device of claim 11, wherein a gamma value determining the image signals for the main-pixels is obtained by deducting the gamma value determining the image signals for the sub-pixels from two times a target gamma value.

14. A liquid crystal display comprising:
    a first insulating substrate;
    a gate line formed on the first substrate with a gate electrode;
    a gate insulating layer formed on the gate line;
    an amorphous silicon layer formed on the gate insulating layer;
    an ohmic contact formed on the amorphous silicon layer;
    a data line formed on the gate insulating layer, of which at least a partial portion includes a source electrode formed on the ohmic contact;
    a drain electrode opposite the source electrode, of which at least a partial portion is placed on the ohmic contact;
    a passivation layer formed on the data line and the drain electrode;
    a pixel electrode formed on the passivation layer and connected to the drain electrode;
    a second insulating substrate opposite the first insulating substrate;
    a common electrode formed on the second substrate;
    a first domain forming means formed on at least one of the first substrate and the second substrate; and
    a second domain forming means formed on at least one of the first substrate and the second substrate to divide a pixel region into a plurality of sub-domains in cooperation with the first domain forming means,
    wherein the pixel electrode is divided into a main-pixel electrode and a sub-pixel electrode, to which different signal voltages are individually applied at the same gray scale, and wherein the signal voltage for the main-pixel electrode is determined by a gamma value satisfying the following equation $$\text{Gamma } K = (\text{current gray scale/maximum gray scale})^f$$

where $f(\text{Gray Scale}) = \alpha \times (\text{maximum gray scale/current gray scale})$, and $\alpha$ is a constant.

15. A liquid crystal display comprising:
a plurality of pixel electrodes divided into main-pixel electrodes and sub-pixel electrodes, to which different signal voltages are individually applied at a same gray scale, and
a signal voltage applied to the sub-pixel electrodes determined by a gamma value Gamma K = (current gray scale/maximum gray scale)$^f$ wherein exponent f is not a constant.

16. The liquid crystal display of claim 15, wherein f varies with respect to current gray scale.

17. The liquid crystal display of claim 16, wherein a minimum value off occurs at the maximum gray scale.

18. The liquid crystal display of claim 15, wherein f is determined by an equation f (gray scale)=α×(maximum gray scale/current gray scale), wherein α is a constant.

19. The liquid crystal display of claim 15, wherein a gamma value of the main-pixel electrodes is obtained by deducting a gamma value of the sub-pixel electrodes from twice a target gamma value.

20. The liquid crystal display of claim 15, wherein the sub-pixel electrodes have a different size than the main-pixel electrodes.

21. The liquid crystal display of claim 15, wherein a signal voltage applied to a main-pixel electrode is higher than a signal voltage applied to a sub-pixel electrode at the same gray scale.

* * * * *

UNITED STATES PATENT AND TRADEMARK OFFICE
CERTIFICATE OF CORRECTION

| | |
|---|---|
| PATENT NO. | : 7,573,453 B2 |
| APPLICATION NO. | : 11/259897 |
| DATED | : August 11, 2009 |
| INVENTOR(S) | : Lee et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Fourteenth Day of December, 2010

David J. Kappos
*Director of the United States Patent and Trademark Office*